J. U. & H. W. FISHER.
Nut-Locks.
No. 155,513. Patented Sept. 29, 1874.
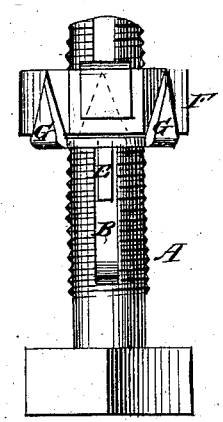
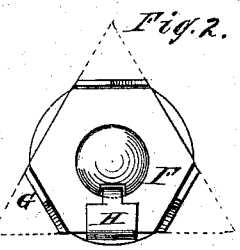
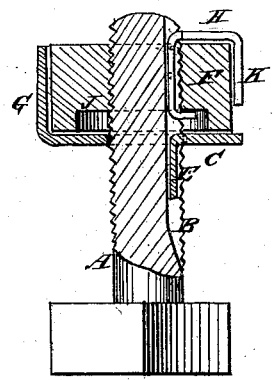
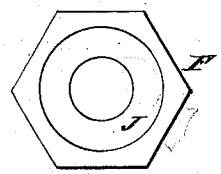
Witnesses:
P. C. Dieterich
O. Sedgwick
Inventor:
J. U. Fisher
H. W. Fisher
Per
[signature]
Attorneys.
THE GRAPHIC CO. PHOTO-LITH.39 & 41 PARK PLACE, N.Y.

UNITED STATES PATENT OFFICE.

JAMES U. FISHER AND HIRAM W. FISHER, OF PENN STATION, PA.

IMPROVEMENT IN NUT-LOCKS.

Specification forming part of Letters Patent No. 155,513, dated September 29, 1874; application filed May 24, 1873.

*To all whom it may concern:*

Be it known that we, JAMES U. FISHER and HIRAM W. FISHER, of Penn Station, in the county of Westmoreland and State of Pennsylvania, have invented a new and useful Improvement in Nut-Locks, of which the following is a specification:

This invention relates to means for preventing the nuts of screw-bolts from working off; and it consists in a grooved bolt, a recessed nut, and a locking-plate, constructed and arranged as hereinafter described.

In the accompanying drawing, Figure 1 represents a bolt with the nut locked according to our invention. Fig. 2 is a top view. Fig. 3 is a section view of a bolt with the nut locked by two plates. Fig. 4 is a view of the modified locking-plate. Fig. 5 shows the nut with the annular recess or rabbet.

A is the bolt. B represents the groove in the bolt. H is the locking-plate, the same having a reduced part or tongue, which is bent up at the end. Said lower or tongue part E of this plate is inserted into the groove in the bolt from the upper side of the nut, and its lower end is turned up on the under side of the same, as seen in Fig. 3. The lower side of the nut has a circular rabbet, J, which receives the end of the hook-plate 1 where it is subject to no friction in turning the nut; then the nut is turned "home," and the part I of the plate is bent over and onto the edge of the nut, as seen at K, thus effectually locking the nut.

When a special safeguard is desired the locking-plate C may also be applied, as seen in Fig. 3. This plate is triangular in form, and has a tongue, E, that enters the groove in the bolt, while its point G is bent up against the side of the nut. The plate acts also as a washer for the nut; but this device I do not claim.

Having thus described our invention, we claim as new and desire to secure by Letters Patent—

The narrow locking-plate H, provided with tongue K, in combination with the grooved bolt and recessed nut, as shown and described.

JAMES U. FISHER.
HIRAM W. FISHER.

Witnesses:
R. G. FORD,
J. A. WATSON.